US012252389B2

(12) United States Patent
Wiese et al.

(10) Patent No.: US 12,252,389 B2
(45) Date of Patent: Mar. 18, 2025

(54) WATER DISPENSER

(71) Applicant: BRITA SE, Taunusstein Hessen (DE)

(72) Inventors: Gernot Wiese, Mainz (DE); Jürgen Herrmann, Weinstadt (DE); Markus Huster, Gross-Gerau (DE)

(73) Assignee: BRITA SE, Taunusstein (DE)

( * ) Notice: Subject to any disclaimer, the term of this patent is extended or adjusted under 35 U.S.C. 154(b) by 476 days.

(21) Appl. No.: 17/760,993

(22) PCT Filed: Aug. 24, 2020

(86) PCT No.: PCT/EP2020/073612

§ 371 (c)(1),
(2) Date: Mar. 16, 2022

(87) PCT Pub. No.: WO2021/052715

PCT Pub. Date: Mar. 25, 2021

(65) Prior Publication Data

US 2022/0297998 A1 Sep. 22, 2022

(30) Foreign Application Priority Data

Sep. 18, 2019 (EP) .................................... 19197977

(51) Int. Cl.
*B67D 1/08* (2006.01)
*B67D 1/00* (2006.01)
*B67D 3/00* (2006.01)

(52) U.S. Cl.
CPC ......... *B67D 1/0888* (2013.01); *B67D 1/0006* (2013.01); *B67D 1/0009* (2013.01); (Continued)

(58) Field of Classification Search
CPC .. B67D 1/0006; B67D 1/0009; B67D 1/0014; B67D 1/0069; B67D 1/0888; B67D 3/0038; B67D 3/007
See application file for complete search history.

(56) References Cited

U.S. PATENT DOCUMENTS 5,350,086 A * 9/1994 Martin ...................... F25D 3/02 62/400
2013/0171320 A1* 7/2013 Scholvinck ........... A47J 31/402 141/100

(Continued)

FOREIGN PATENT DOCUMENTS

WO 2012178044 A1 12/2012
WO 2017022979 A1 2/2017

*Primary Examiner* — Mark A Connolly
(74) *Attorney, Agent, or Firm* — Hudak, Shunk & Farine Co. LPA

(57) ABSTRACT

A method for operating a water dispenser, the water dispenser having a water supply, a carbon dioxide supply, an outlet for pouring water into a container placed below the outlet, a controller and a user interface, the method including the following steps, which are executed in response to an activation of the water dispenser via the user interface:

determining a nominal value of a water volume (V) that is to be filled into the container determining a nominal value of a waiting period (WP) by means of the controller determining nominal values of a first partial volume (V1) and a second partial volume (V2) by means of the controller (V1+V2=V), in particular by determining a volume ratio (R) with R=V1/V for dividing the water volume (V) into the partial volumes (V1, V2)

pouring the first partial volume (V1) through the outlet waiting through the waiting period (WP)

pouring the second partial volume (V2) through the outlet.

20 Claims, 2 Drawing Sheets

(52) U.S. Cl.
CPC ......... *B67D 1/0014* (2013.01); *B67D 1/0069* (2013.01); *B67D 3/0038* (2013.01); *B67D 3/0077* (2013.01)

(56) References Cited

U.S. PATENT DOCUMENTS

| | | | | |
|---|---|---|---|---|
| 2014/0239521 | A1* | 8/2014 | Ergican | B01F 23/2323<br>261/DIG. 1 |
| 2020/0122994 | A1* | 4/2020 | Cimatti | B67D 1/0888 |
| 2020/0369505 | A1* | 11/2020 | McKay | B67D 1/10 |

* cited by examiner

WATER DISPENSER

FIELD OF THE INVENTION

The present invention relates to a method for operating a water dispenser, a computer program, a computer-readable medium and a water dispenser.

BACKGROUND OF THE INVENTION

Water dispensers such as the BRITA® VIVREAU Sodamaster 50 are generally known. Said water dispenser comprises a coupling with which the water dispenser may be connected to a water supply system such as the tap in a household, an outlet for pouring water into a container placed below the outlet and a touch display for initiating the flow of water.

It is particularly possible to carry out the water dispensing process in one of two ways. Either the user is directly in charge of starting and ending the pouring of water or the user only initiates the dispensing process, in which case the water dispenser automatically starts and stops the pouring of water. The start usually follows immediately after the initiation by the user. The termination of the pouring is usually controlled by a predetermined water volume, which in some cases can be taught to the water dispenser by the consumer. During the teaching of said water volume, the consumer fills up the container as high as desired and then confirms to the water dispenser that the amount poured so far is the desired amount of water. The water dispenser stores this information in his memory for future dispensing processes. From then on the water dispenser will pour the same amount of water in every dispensing process.

Water dispensers can be provided with a carbon dioxide supply for carbonating the water before pouring it into the container. The carbon dioxide supply usually comprises a replaceable carbon dioxide tank. Carbonizing the water can influence the dispensing process in a non-desired way as follows. It is usually desired to fill up the container as high as possible, at least to a certain degree and the consumer will teach the corresponding amount to the water dispenser with or without using carbonated water and by possibly pushing the button for pouring water repeatedly. However, carbonized water leads to bubble formation on the water surface in the container during the dispensing process. Pouring carbonated water up to a high level in the container can then result in water spilling over the rim of the container, which is obviously undesired. The risk of such spilling increases with the desired filling level in the container.

SUMMARY OF THE INVENTION

The object of the present invention is to improve the dispensing process of water dispensers.

This object is solved by the method for operating a water dispenser.

The method for operating a water dispenser, the water dispenser having a water supply, a carbon dioxide supply, an outlet for pouring water into a container placed below the outlet, a controller and a user interface, comprises the following steps, which are executed in response to an activation of the water dispenser via the user interface:

- determining a nominal value of a water volume V that is to be filled into the container, in particular by means of the controller,
- determining a nominal value of a waiting period WP by means of the controller
- determining nominal values of a first partial volume V1 and a second partial volume V2 with V1+V2=V by means of the controller,
- pouring the first partial volume V1 through the outlet
- waiting through the waiting period WP
- pouring the second partial volume V2 through the outlet.

The step of determining the nominal values of the first partial volume V1 and the second partial volume V2 is preferably executed by determining a volume ratio R=V1/V for dividing the water volume V into the partial volumes V1, V2. The term “dividing” in this context refers to the fact that the partial volumes V1, V2 are separately poured into the container, being separated by the waiting period WP. In the container itself of course, the partial volumes V1, V2 intermix.

The controller preferably determines the nominal value of the water volume V by reading an input value entered by means of the user interface or stored on a computer readable medium.

In one embodiment the nominal values of the volume ratio R and the waiting period WP are also stored on a computer readable medium and being read by the controller.

The inventors have found that it is possible to fulfill the desire for filling the container as completely as possible, in a time as short as possible and avoiding water spillage at the same time by means of the invention. Bubbles are known to form along the surface of the vessel or container and bubble formation is particularly high in dry containers. For this reason glasses are sometimes rinsed with water before being filled e.g. with beer coming from a tap. With the method according to the invention bubbles will form during the pouring of the first partial volume V1. These bubbles can then burst and settle down during the waiting period WP. However, the bubbles will wet the interior of the container above the nominal water level of the partial volume V1. The second partial volume V2, which is then poured into the container, will again result in bubble formation, but the bubble formation will be reduced because the interior of the container is at least partially wet. Accordingly, it is one object of the invention to set the volume ration R in such a way that the first partial volume V1 and the bubbles formed upon pouring of the first partial volume V1 are filling the container up to its maximum capacity so that its inner surface ideally is entirely wetted. Fortunately, it turned out that this effect, in a first approximation, does not depend on the absolute volume and on the shape of the container so that the choice of the volume ratio R, to a certain extent, is universally valid.

The nominal values for the partial volumes V1, V2 may also be determined in other ways. In particular, in some embodiments the nominal value of the second partial volume V2 is set at a fixed value, which may be stored in a computer readable medium accessible by the controller. The nominal value of the first partial volume V1 can then be determined by subtracting the second partial volume V2 from the water volume V. Such embodiments can be particularly useful if the user has only few choices regarding the water volume V. In such cases, the nominal value of the second partial volume V2 is fixed at a value with which a reduced risk of spillage is effected for all possible water volumes V.

If the nominal value of the second partial volume V2 is set at a fixed value, said value is preferably stored on a computer readable medium of the water dispenser accessible to the controller. Accordingly, the controller determines the nominal value V2 by reading the input value from the computer readable medium and the nominal value V1 by calculating the difference V−V2.

The risk of spillage is decreased in any case as a result of the reduction in bubble formation during the pouring of the second partial volume V2 and also because the bubbles of the pouring of the first partial volume V1 have at least partially burst during the waiting period WP. The container can be filled to a higher level without risking spillage as a result.

Both the volume ratio R and the waiting period WP serve particular and unique purposes for the dispensing process. While the volume ratio R has an impact on the wetting of the interior of the container the waiting period WP will determine how many of the bubbles that have formed during the pouring of the first partial volume V1 have burst before the pouring of the second partial volume V2 commences.

The nominal value of the waiting period WP and/or the volume ratio R are preferably determined on the basis of at least one of the following parameters:

- the water volume V
- a first temperature T1 of the water being poured
- a second temperature T2 of an area surrounding the water dispenser
- a saturation degree of carbon dioxide in the water volume V, in particular in the second partial volume V2
- a flow rate Q of the water dispenser.

The saturation degree is defined as follows. If the amount of carbon dioxide that is solved in the water that is to be poured is s1 and the highest amount of carbon dioxide that can be solved in the water at the same circumstances (Temperature, pressure, etc.) is s2, then $D=s1/s2$. It should be clear that $0 \leq D \leq 1$.

All of the mentioned parameters have an influence on the formation of bubbles in the container. It is therefore advantageous to determine the nominal value of the waiting period WP and/or the volume ratio R based on at least one of these parameters. Bubble formation increases with both the saturation degree D and the flow rate Q in particular so that the waiting period WP is preferably increased with these parameters.

Each one of the parameters may be measured using one or more sensors, in particular immediately after the dispensing process has been initiated, or may be stored electronically in the form of fixed values on the computer-readable medium of the water dispenser or, as for example the water volume V, may be entered by means of the user interface. If sensors are used, the dispensing process can be executed in a way that is tailored to its environmental conditions.

In the case of the first temperature T1, the information stored on the computer-readable medium can be a target temperature, in particular when the water dispenser is provided with water cooling or heating means. The water dispenser will be programmed so that it aims at providing water at the target temperature. At the same time the target temperature may be used for determining the nominal value of the waiting time WP and/or the volume ratio R.

The first temperature T1, the second temperature T2, the saturation degree D and/or the flow rate Q are preferably the same for both the first partial volume V1 and the second partial volume V2. With this, the complexity of the water dispenser and thus its production cost is limited.

The nominal value of the waiting period WP may additionally or solely be determined on the basis of the volume ratio R. As noted above the waiting period WP determines how many of the bubbles that have formed during the pouring of the first partial volume V1 will burst before the pouring of the second partial volume V2. The volume ratio R in turn has a direct impact on how many bubbles will form during the pouring of the first partial volume V1. It is therefore beneficial to determine the nominal value of the waiting period WP based on the volume ratio R. It should be clear that an increase in the volume ratio R preferably results in an increase of the nominal value of the waiting period WP.

The acceptance of the user for certain features must always be considered when operating a water dispenser. It is not desirable to increase the waiting period WP too much as this could possibly confuse the consumer. For example, if the waiting period WP is too long, the consumer might be tempted to remove the container before the dispensing process is completed. On the other hand, a waiting period WP that is too short will not have any or only little positive effect on the bubbles present in the container resulting in potential water spillage.

The suitable waiting period WP depends on the particular circumstances, in particular on the water volume V that is to be poured, the saturation degree D of carbon dioxide in the water and the flow rate Q of the water dispenser.

It has been found that a nominal value of the waiting period WP of between 0.5 s and 3 s, in particular between 0.5 s and 1.5 s, is generally advantageous with regard to both, the bubble bursting and the acceptance of the user.

The volume ratio R must also be chosen carefully. If the volume ratio R is too small, meaning that the first partial volume V1 is too small in comparison to the water volume V or the second partial volume V2, the beneficial effect of the inventive method is diminished as the container will not be wetted by the bubbles high enough. As a result too many bubbles will form during the pouring of the second partial volume V2 and the container will overflow during the pouring of the second partial volume V2. If on the other hand the volume ratio R is too large, the container will overflow before the first partial volume V1 is completely poured into the container.

In general it has been found that the volume ratio R should preferably be between 0.8 and 0.97, in particular between 0.9 and 0.97. For volume ratios R below 0.8 the division of the water volume V into two parts has little or no effect, presumably because the bubbles formed during the pouring of the first partial volume V1 do not wet the interior of the container high enough. Between 0.8 and 0.9, the wetting effect is better, but not entirely satisfying.

The controller preferably provides signals based on the determined volume ratio R and/or the determined nominal value of the waiting period WP to other components, in particular to a valve and/or a mixing unit for mixing water and carbon dioxide of the water dispenser.

In particular, pouring the first and second partial volumes V1, V2 may each be executed by opening the valve and/or activating the mixing unit. The actual volume having been poured can for example be determined via the flow rate Q and the time elapsed since opening the valve and/or activating the mixing unit. During the waiting period WP, the valve is closed and/or the mixing unit is deactivated.

As noted above, the water dispenser may be capable of pouring different amounts of water for different dispensing processes. For the inventive method, the water volume V, the nominal value of the waiting period WP and/or the volume ratio R is therefore preferably determined by gathering information from a computer-readable medium of the water dispenser. The water volume V, the nominal value of the waiting period WP and/or the volume ratio R may be particularly determined by identifying which button of a multitude of buttons is pressed on the user interface and then gathering information from the computer-readable medium based on the identification of the button pressed by the user. For this, the user interface preferably provides a selection of different choices to the user, in particular a selection of different water volumes that can be poured, a selection of different temperatures T1 at which the water is to be poured and/or a selection of different saturation degrees at which the water is to be poured. The water volume V, the nominal value of the waiting period WP and/or the volume ratio R can then be determined based on the values chosen by the user.

The buttons of the user interface may be physically separated buttons or predetermined areas on a multi-touch display or the like. For example, the water dispenser could be provided with two physically separate buttons, one resulting in a water volume of 200 ml being poured, the other resulting in a water volume of 1000 ml being poured.

The method according to the invention may further comprise the step of providing information about a status of the method to the user. Such information may include the determined nominal values of the water volume V, the waiting period WP and/or the volume ratio R themselves as well as ongoing status information informing the user that the first partial volume V1 is poured, that the pouring is paused for the duration of the waiting period WP and/or that the second partial volume V2 is poured. The information provided to the user may also include a signal indicating that the pouring is completed. The information is preferably provided to the user via the user interface.

The object of the invention is also solved by a computer program comprising instructions to cause a water dispenser having a water supply, a carbon dioxide supply, an outlet for pouring water into a container placed below the outlet, a controller and a user interface to execute the steps of the method as described above.

The computer program provides the same beneficial effects as the method itself.

The object of the invention is also solved by a computer-readable medium having stored thereon said computer program.

The object of the invention is also solved by a water dispenser having a water supply, a carbon dioxide supply, an outlet for pouring water into a container placed below the outlet, a controller, a user interface and a computer-readable medium as described above.

The water supply may comprise a water tank or a coupling for connecting the water dispenser to an external water supply system, such as a tap in a house.

The carbon dioxide supply may comprise a carbon dioxide tank or a coupling for connecting the water dispenser to an external carbon dioxide supply system.

The water dispenser may further comprise at least one of the following additional components:

- a casing surrounding one or more of the components of the water dispenser;
- a display, in particular when the buttons are not present in the form of a multi-touch display;
- a mixing unit for mixing water from the water supply and carbon dioxide from the carbon dioxide supply;
- a pump for pumping water from the water supply to the outlet;
- a valve for selectively allowing the passage of water from the water supply, the carbon dioxide supply and/or the mixing unit to the outlet;
- one or more sensors for determining one or more of the parameters as described above.

BRIEF DESCRIPTION OF THE DRAWINGS

The invention will be described in detail with reference to the examples shown in the drawings, in which the following is shown.

DETAILED DESCRIPTION OF THE INVENTION

Figure 1:
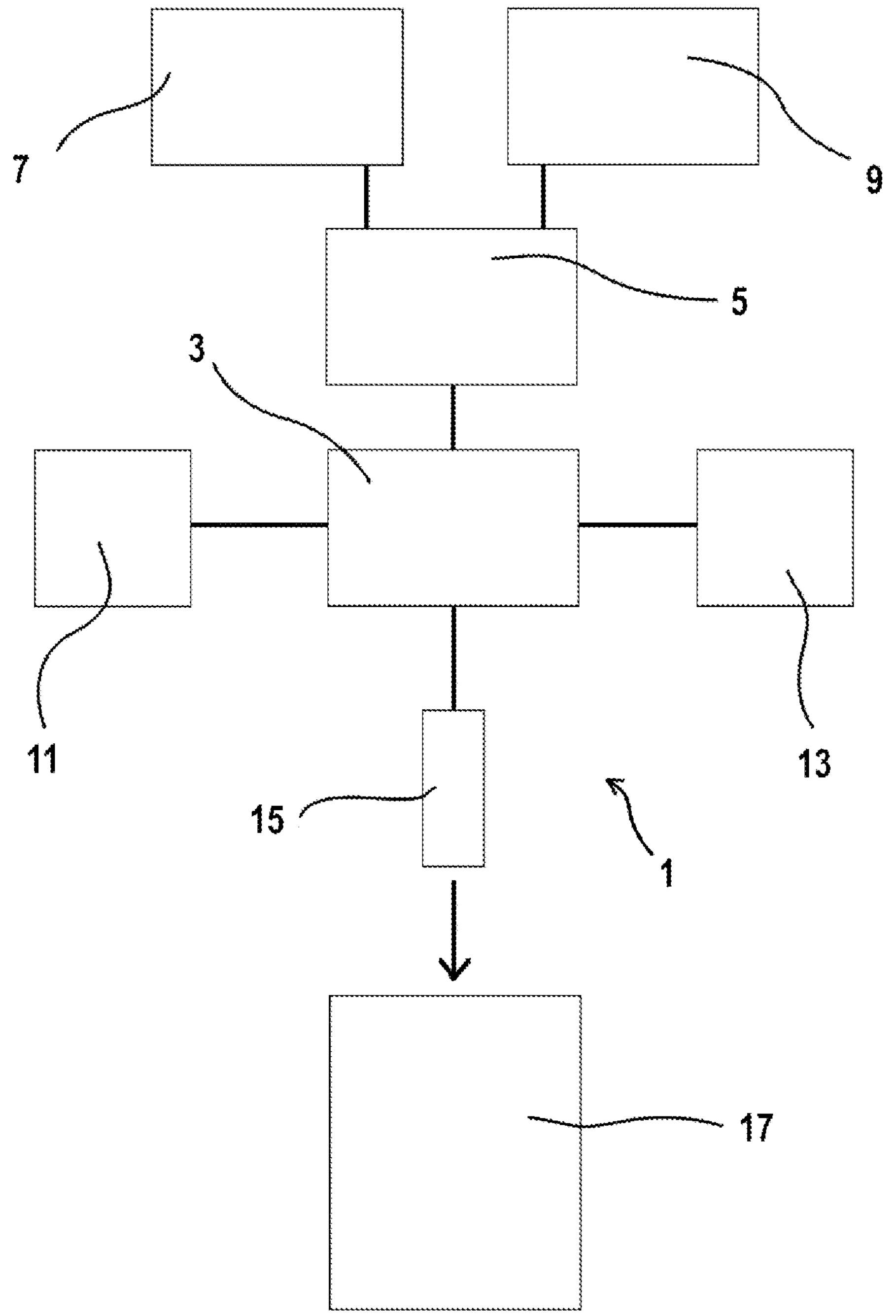
FIG. 1 schematically a water dispenser according to the invention.

The water dispenser 1 shown in FIG. 1 comprises a mixing unit 3, a controller 5, a computer-readable medium 7, a multi-touch display 9, a water tank 11 and a carbon dioxide tank 13 as well as an outlet 15. The water tank 11 contains water and the carbon dioxide tank 13 contains pressurized carbon dioxide.

The purpose of the water dispenser 1 is mainly to pour carbonated water into a container 17 placed below the outlet 15. The multi-touch display 9 acts as a user interface. The display 9 provides information to the user such as a selection of different water volumes that can be poured, a selection of different temperatures T1 at which the water is to be poured and/or a selection of different saturation degrees D at which the water is to be poured. For this purpose several buttons may be shown n the multi-touch display 9 so that the user may choose the properties at which the water is to be poured into the container by pressing the multi-touch display in the location of one of the buttons on the display 9.

By pressing n the display 9 the water dispenser 1 is activated by the user. The controller 5 determines which area on the display 9 has been pressed and then determines the nominal value of the water volume V and possibly other parameters of the water that is to be filled into the container 17 by accessing a database on the computer readable medium 7 indicating which button is shown in which area of the display 9 and which nominal value of the water volume V is associated with said button.

In addition to the water volume V and possibly other parameters of the water, the controller 5 determines the nominal value of a waiting period WP and a volume ratio R associated with said nominal value of the water volume V and any other parameter. The waiting period WP and the volume ratio R vary for different water volumes V and any other parameter, so that the controller 5 determines the waiting period WP and the volume ratio R based n the water volume V and any other parameter by accessing the computer readable medium 7 and gathering the appropriate waiting period WP and volume ratio R based on said specific water volume V and any other parameter chosen by the user. The information which waiting period WP and/or volume ratio R should be chosen for which water volume V and any other parameter may be stored in a database or a table on the computer readable medium 7. In other embodiments the waiting period WP and the volume ratio R may each be stored as one specific value on the computer readable medium 7 so that the controller 5 only has to retrieve said specific values for determining the waiting period WP and the volume ratio R thus carrying out the method according to the invention.

With the volume ratio R the water volume V that is to be poured into the container 17 is divided into a first partial volume V1 and a second partial volume V2 meaning that the nominal value of the water volume V is divided into nominal values for the partial volumes V1, V2 with V1+V2=V and R=V1/V.

The mixing unit 3 is connected to both the water tank 11 and the carbon dioxide tank 13. An activation of the mixing unit 3 results in an opening of a valve (not shown), which opens up the connection between the mixing unit 3 and the carbon dioxide tank 13. The mixing unit 3 further comprises a pump (not shown) for pumping water from the water tank 11 into the mixing unit 3. Said pumping is initiated when the mixing unit 3 is activated. By opening the valve and activating the pump water and carbon dioxide flow into the mixing unit where they are mixed, thus creating carbonized water 3. From the mixing unit 3 the carbonized water flows to the outlet 15 and exits the outlet 15, thus being poured into the container 17.

For the pouring process the controller 5 first determines the water volume V, the waiting period WP and the volume ratio R as described above and then opens the valve and activates the mixing unit 3, thereby pouring the first partial volume V1 through the outlet 15 into the container 17.

When the first partial volume V1 has been poured, which may be determined via a flow sensor (not shown) or a measurement of the pouring time for example, the controller 5 closes the valve and deactivates the mixing unit 3, thereby stopping the pouring of water through the outlet 15. The controller 5 now waits through the waiting period WP. Afterwards the controller 5 opens the valve and activates the mixing unit 3 once more, thereby pouring the second partial volume V2 through the outlet 15 into the container 17.

In other embodiments the water tank 11 may be replaced by a coupling for connecting the water dispenser 1 to an external water supply system such as a tap. In such embodiments, the water dispenser 1 does not need a pump, because the external water supply will usually supply water under pressure sufficient for transporting the water to the outlet 15. Instead, the water dispenser 1 has an additional valve in such embodiments for selectively allowing or disallowing the passage of water from the coupling to the mixing unit 3. Said additional valve is opened when the mixing unit 3 is activated and closed when the pouring is completed.

Figure 2:
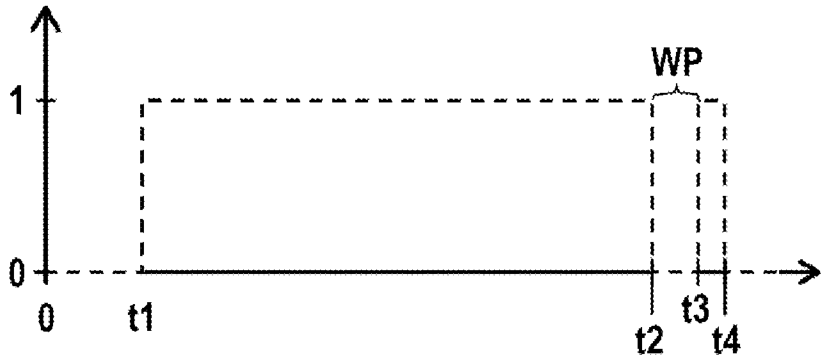
FIG. 2 a graph illustrating the pouring of water over time.

The graph shown in FIG. 2 illustrates the pouring process of the water dispenser 1 of FIG. 1. The time is shown on the horizontal axis while the vertical axis indicates the status of the mixing unit 3 in a binary manner showing either the value 0 for a deactivated mixing unit or the value 1 for an activated mixing unit.

At the beginning (t=0) the mixing unit 3 is deactivated. At t1 the mixing unit 3 is activated by the controller 5, whereby carbonated water is poured into the container 17 as described above. At t2 the mixing unit 3 is deactivated, because the first partial volume V1 has been poured into the container 17. During the pouring of the first partial volume V1, bubbles will form on a surface of the water poured into the container 17, thereby wetting an inner surface of the container 17 in areas above the nominal water level.

As described above the controller 5 waits through the waiting period WP. The waiting period WP encompasses the time period between t2 and t3. During the waiting period WP, these bubbles will burst at least partially, but the wetted surface areas will remain wet.

At t3 the mixing unit 3 is activated once more for pouring the second partial volume V2 into the container 17. The pouring of the second partial volume V2 is concluded at t4, at which point the controller deactivates the mixing unit 3 once more. During the pouring of the second partial volume V2 some bubbles may form n the surface of the water already poured into the container 17, but the amount of bubbles present at the end f the pouring of the second partial volume V2 will be reduced in comparison with pouring the water volume V in one go. This is achieved both by bubbles bursting during the waiting period WP and by the bubbles of the first partial volume V1 having wet the inside of the container 17 during the pouring of the first partial volume V1, thus reducing the bubble formation during the pouring of the second partial volume V2.

It can be seen that the time period between t3 and t4 is much shorter than the time period between t1 and t2. Because the flow rate of the water dispenser 1 is the same for both, the first partial volume V1 and the second partial volume V2 the second partial volume V2 is much smaller than the first partial volume V1. This illustrates the volume ratio R that was determined by the controller 5 before the pouring process. In the present case the volume ratio R being equal to V1/V is about 0.95.

LIST OF REFERENCES

1 water dispenser
3 mixing unit
5 controller
7 computer-readable medium
9 display
11 water tank
13 carbon dioxide tank
15 outlet
17 container
WP waiting period

What is claimed is:

1. A method for operating a water dispenser, the water dispenser having a water supply, a carbon dioxide supply independent from the water supply, an outlet for pouring water saturated with a saturation degree (D) of carbon dioxide into a container placed below the outlet, a controller and a user interface, the method comprising the following steps, which are executed in response to an activation of the water dispenser via the user interface:
- determining a nominal value of a water volume (V) that is to be filled into the container;
- determining a nominal value of a waiting period (WP) using the controller;
- determining nominal values of a first partial volume (V1) and a second partial volume (V2) with V1+V2=V using the controller, in particular by determining a volume ratio (R) with R=V1/V for dividing the water volume (V) into the partial volumes (V1, V2);
- pouring the first partial volume (V1) through the outlet;
- waiting through the waiting period (WP); and
- pouring the second partial volume (V2) through the outlet, and
  - wherein the waiting period (WP) and the volume ratio (R) are determined on the basis of at least the saturation degree (D) of carbon dioxide in the water volume (V).

2. The method for operating a water dispenser according to claim 1, wherein the waiting period (WP) and/or the volume ratio (R) are further determined on the basis of at least one of the following parameters:
- the water volume (V),
- a first temperature (T1) of the water being poured,
- a second temperature (T2) of an area surrounding the water dispenser, and
- a flow rate (Q) of the water dispenser.

3. The method for operating a water dispenser according to claim 2, wherein the first temperature (T1), the second temperature (T2), the saturation degree (D) and/or the flow rate (Q) are the same for both the first partial volume (V1) and the second partial volume (V2).

4. The method according to claim 3, wherein the nominal value of the waiting period (WP) is between 0.5 s and 3 s, wherein the volume ratio (R) is between 0.8 and 0.97, and wherein the controller provides signals based on the determined volume ratio (R) and/or the determined nominal value of the waiting period (WP) to other components of the water dispenser.

5. The method according to claim 4, wherein the water volume (V), the nominal value of the waiting period (WP) and/or the volume ratio (R) is determined by gathering information from a computer-readable medium of the water dispenser, wherein the water volume (V), the nominal value of the waiting period (WP) and/or the volume ratio (R) is determined by identifying which button of a multitude of buttons is pressed on the user interface and then gathering information from the computer-readable medium based on the identification of the button pressed by the user, and wherein the method further comprises the step of providing information about a status of the method to the user.

6. The method for operating a water dispenser according to claim 1, wherein the nominal value of the waiting period (WP) is between 0.5 s and 3 s.

7. The method for operating a water dispenser according to claim 1, wherein the volume ratio (R) is between 0.8 and 0.97.

8. The method for operating a water dispenser according to claim 1, wherein the controller provides signals based on the determined volume ratio (R) and/or the determined nominal value of the waiting period (WP) to other components of the water dispenser.

9. The method for operating a water dispenser according to claim 1, wherein the water volume (V), the nominal value of the waiting period (WP) and/or the volume ratio (R) is determined by gathering information from a computer-readable medium of the water dispenser.

10. The method for operating a water dispenser according to claim 1, wherein the water volume (V), the nominal value of the waiting period (WP) and/or the volume ratio (R) is determined by identifying which button of a multitude of buttons is pressed on the user interface and then gathering information from the computer-readable medium based on the identification of the button pressed by the user.

11. The method for operating a water dispenser according to claim 1, wherein the method further comprises the step of providing information about a status of the method to the user.

12. The method for operating a water dispenser according to claim 1, wherein the saturation degree (D) of carbon dioxide is varied based upon selection using the user interface.

13. A computer-readable medium having stored thereon a computer program comprising instructions to cause a water dispenser having a water supply, a carbon dioxide supply, an outlet for pouring water into a container placed below the outlet, a controller and a user interface to execute the steps of the method of claim 1.

14. A water dispenser having a water supply, a carbon dioxide supply, an outlet for pouring water into a container placed below the outlet, a controller, a user interface and the computer-readable medium according to claim 11.

15. The water dispenser according to claim 14, wherein the water supply comprises a water tank and/or a coupling for connecting the water dispenser to an external water supply system.

16. The water dispenser according to claim 14, wherein the carbon dioxide supply comprises a carbon dioxide tank and/or a coupling for connecting the water dispenser to an external carbon dioxide supply system.

17. The water dispenser according to claim 14, wherein the water dispenser further comprises at least one of the following additional components:

a casing surrounding one or more of the components of the water dispenser;

a display, in particular when the buttons are not present in the form of a multi-touch display;

a mixing unit for mixing water from the water supply and carbon dioxide from the carbon dioxide supply;

a pump for pumping water from the water supply to the outlet;

a valve for selectively allowing the passage of water from the water supply, the carbon dioxide supply and/or the mixing unit to the outlet;

one or more sensors for determining one or more of the parameters as described above.

18. A computer-readable medium having stored thereon a computer program comprising instructions to cause a water dispenser having a water supply, a carbon dioxide supply, an outlet for pouring water into a container placed below the outlet, a controller and a user interface to execute the steps of the method of claim 5.

19. A water dispenser having a water supply, a carbon dioxide supply, an outlet for pouring water into a container placed below the outlet, a controller, a user interface and the computer-readable medium according to claim 18.

20. A method for operating a water dispenser, the water dispenser having a water supply, a carbon dioxide supply independent from the water supply, an outlet for pouring water saturated with a saturation degree (D) of carbon dioxide into a container placed below the outlet, a controller and a user interface, the method comprising the following steps, which are executed in response to an activation of the water dispenser via the user interface:

determining a nominal value of a water volume (V) that is to be filled into the container;

determining a nominal value of a waiting period (WP) using the controller;

determining nominal values of a first partial volume (V1) and a second partial volume (V2) with $V1+V2=V$ using the controller, in particular by determining a volume ratio (R) with $R=V1/V$ for dividing the water volume (V) into the partial volumes (V1, V2);

pouring the first partial volume (V1) through the outlet;

waiting through the waiting period (WP); and pouring the second partial volume (V2) through the outlet, and wherein the waiting period (WP) and the volume ratio (R) are determined by the controller based on water volume (V).

* * * * *